P. J. GINLEY.
CHAIN TIGHTENER.
APPLICATION FILED MAR. 29, 1917.
1,283,729.
Patented Nov. 5, 1918.
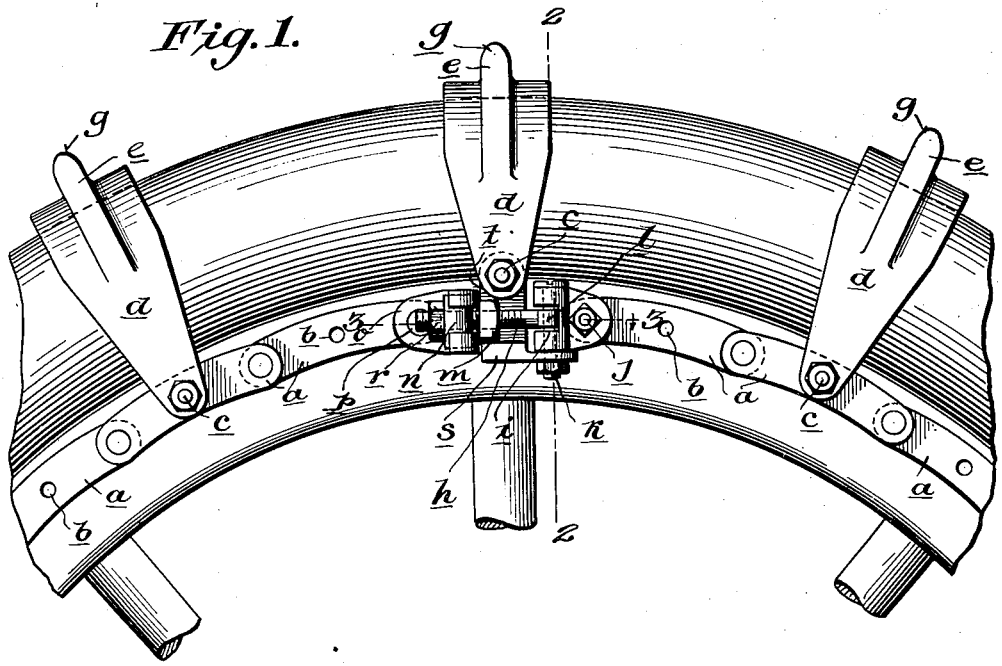
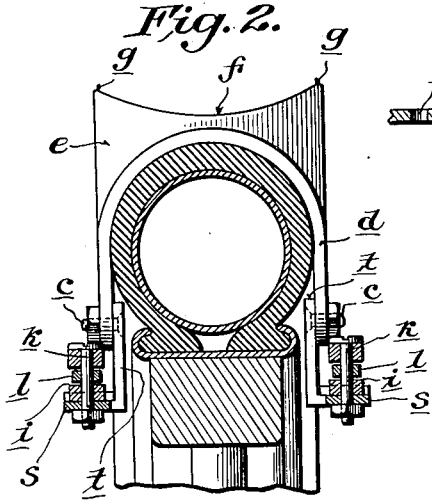
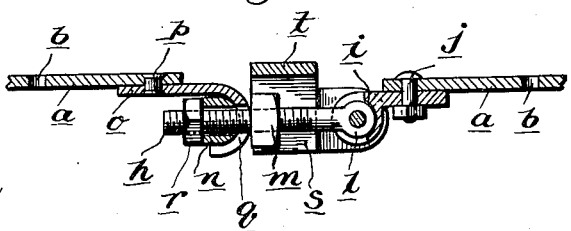
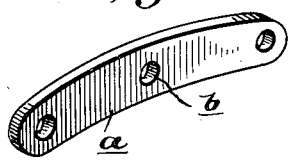
Witness
Chas. L. Griesbauer.
Inventor
Patrick J. Ginley
By Davis & Davis
Attorneys

UNITED STATES PATENT OFFICE.

PATRICK J. GINLEY, OF PITTSTON, PENNSYLVANIA.

CHAIN-TIGHTENER.

1,283,729.          Specification of Letters Patent.          Patented Nov. 5, 1918.

Application filed March 29, 1917. Serial No. 158,240.

*To all whom it may concern:*

Be it known that I, PATRICK J. GINLEY, a citizen of the United States of America, and a resident of Pittston, county of Luzerne, State of Pennsylvania, have invented certain new and useful Improvements in Chain-Tighteners, of which the following is a full and clear specification.

The object of this invention is to provide a simple and inexpensive tightener for chains used on motor vehicle wheels which will increase the durability of the wheel as well as the tractive power thereof and also prevent skidding, as more fully hereinafter set forth.

In the drawing—

Figure 1 is a side elevation of a portion of a wheel provided with my invention;

Fig. 2 is a cross-section on the line 2—2 of Fig. 1;

Fig. 3 is a section on the line 3—3 of Fig. 1; and

Fig. 4 is a detail perspective of one of the links.

At each side of the wheel, at a point inwardly of the tire, I arrange a chain formed of strong flat links $a$, pivoted together at their overlapping ends and each provided midway of its ends with a bolt hole $b$. Pivotally connected to the links at said holes $b$, by means of bolts $c$ is a series of tread arches $d$ which fit around the tread surface of the tire when the same is inflated, these tread arches consisting of plates which have broad bearing upon the tread surface of the tire. Each of these tread arches is provided on its tread surface with a central rib $e$ which extends radially with respect to the wheel and transversely of the tire tread. The outer edge of the rib $e$ is concaved at $f$ to thereby form two entering points $g$ at its outer corners. These ribs $e$ materially increase the tractive power, especially in soft ground and mud, and the points $g$ bite into the surface of hard road beds and thus prevent skidding.

The tread arches may be secured to as many of the links as desired. If they are secured to all the links, it will be observed that they form not only secure anti-skid means and traction means, but also serve as a sort of cover or armor for the tire, to thereby prevent wear of the tread surface proper of the tire. The ends of the chains are secured together by a bolt $h$ which is pivotally connected at one end to the adjacent link by means of a clip $i$, which clip is pivotally connected to said link by pivot bolt $j$. The pivotal connection between the bolt $h$ and the clip $i$ is a radially arranged bolt $k$ which passes through an eye $l$ on the end of the bolt. The opposite or free end of the bolt is threaded, and on this threaded end is screwed stop nut $m$. Beyond the stop nut is arranged a bearing nut $n$ which is convex on one side to fit into a correspondingly shaped hook $o$ connected to the adjacent link of the chain by a rivet pivot $p$. The hook plate $o$ is slotted at $q$ for the passage of the bolt, and nut $r$ on the bolt is adapted to force the bearing nut $n$ into the hook end of the plate $o$ and thus tighten the chain. The tightening of the chain will bring the inner or convex face of the hook plate $o$ against the stop nut $m$ and thus rigidly lock the parts together. The nut $m$ is adjustable to permit the chain to be nicely adjusted to wheels that vary slightly in size.

The stop nut $m$ is prevented from turning by means of a stop plate $s$ which is fastened to one end of the clip $i$ by the aforesaid bolt $k$ which forms a pivotal connection between the bolts $h$ and the clip $i$. This stop plate $s$ has a radial extension $t$ to which is connected one end of one of the tread arches $d$. By thus providing means at the joint of the chain for attaching a tread arch, it will be seen that I provide against any break in the spacing of the tread arches around the tire.

It will be understood that other types of anti-skid devices may be attached to the chains.

The nature and scope of the invention having been thus indicated and its preferred embodiment having been specifically described, what is claimed as new is:

In a device of the class set forth, a pair of chains, means for connecting the ends of the chains adjustably consisting of a bolt connected at one end pivotally to one end of the chain, means for detachably connecting the other end of the bolt to the adjacent end of the chain embodying a hook pivotally connected to the chain, a stop nut on the bolt adapted to abut the hook, and means for preventing said stop nut rotating on the bolt while in abutting relation to the hook.

In testimony whereof I hereunto affix my signature.

his
    PATRICK  X  J. GINLEY.
         mark

Witness to mark:
 THOS. S. LOFTUS.